United States Patent [19]

Surdi

[11] 4,405,285
[45] Sep. 20, 1983

[54] DEVICE TO LOCK THE BLADES OF A TURBOBLOWER AND TO FASTEN THE FRONT COWL OF A TURBOJET ENGINE

[75] Inventor: Jean M. Surdi, Melun, France

[73] Assignee: Societe Nationale d'Etude et de Construction de Moteurs d'Aviation, "S.N.E.C.M.A.", Paris, France

[21] Appl. No.: 360,882

[22] Filed: Mar. 22, 1982

[30] Foreign Application Priority Data

Mar. 27, 1981 [FR] France .................... 81 06576

[51] Int. Cl.³ .................... F01D 5/32; F04D 29/34
[52] U.S. Cl. .................... 416/220 R; 416/245 R; 411/119; 411/401
[58] Field of Search ........... 416/220 R, 220 A, 245 R; 411/401, 119, 116, 117

[56] References Cited

U.S. PATENT DOCUMENTS 3,799,693  3/1974  Hull .................... 415/121
4,033,705  7/1977  Leubering .................... 416/220

FOREIGN PATENT DOCUMENTS 1501492 10/1967 France .
2013647  4/1970 France .
2345605  1/1979 France .
 739870 11/1955 United Kingdom .

Primary Examiner—Harvey C. Hornsby
Assistant Examiner—Brian J. Bowman
Attorney, Agent, or Firm—Bacon & Thomas

[57] ABSTRACT

Device for the locking of blade roots and the fastening of the forward cowl consisting of a fastening piece comprising a parallelepipedic part (16) engaging radial slots (5) of the teeth (4) of the rim, a prismatic part (17), the convergent faces of which are resting against the sides of the groove and a cylindrical part (22) for the fastening of the cowl (24). The parallelepipedic (16) and prismatic (17) parts are parallel to each other and perpendicular to the cylindrical part (22). The cowl (24) has perforated counterbores (25) through which the cylindrical parts (22) are passing, with the ends of the cylindrical parts receiving a screw (27) to fasten the cowl.

5 Claims, 4 Drawing Figures

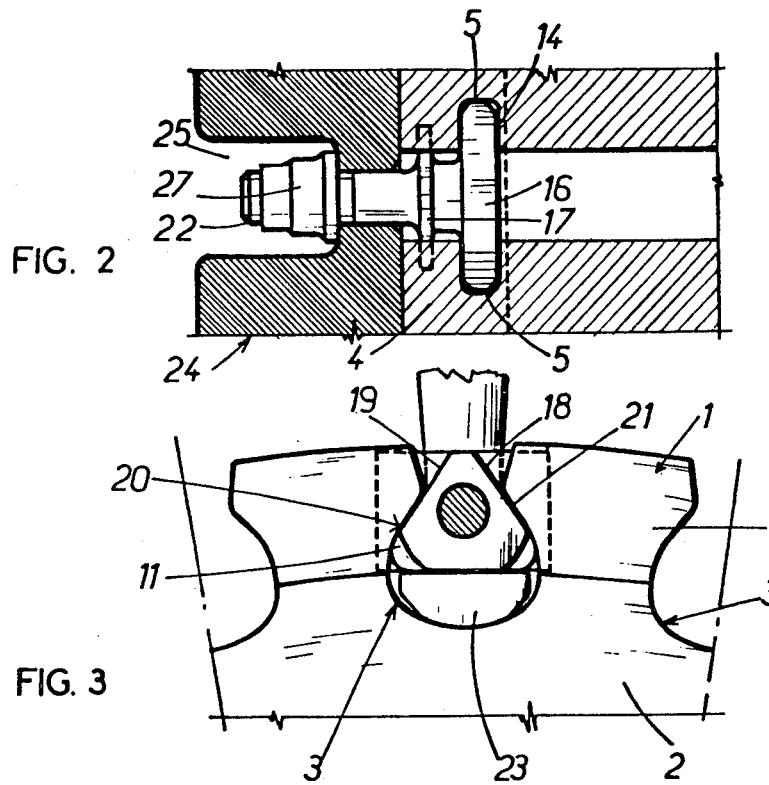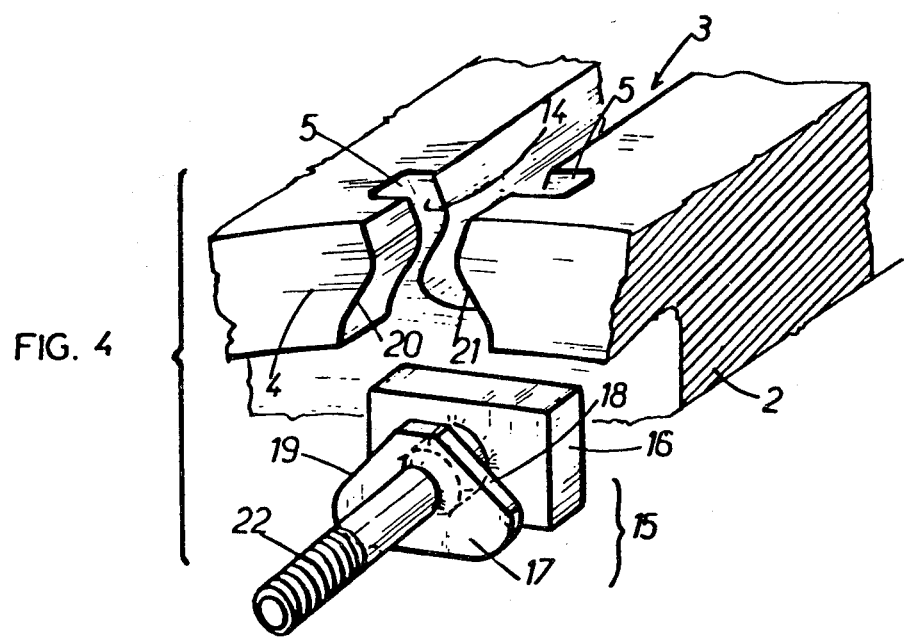

DEVICE TO LOCK THE BLADES OF A TURBOBLOWER AND TO FASTEN THE FRONT COWL OF A TURBOJET ENGINE

BACKGROUND OF THE INVENTION

The invention concerns a device to lock the blades of a turbofan and to fasten the front cowl of a turbojet engine, with the blades being retained in the axial grooves of the rotor.

In the turbofans of conventional turbojet engines, the blades are locked in axial grooves of the rotor in a manner to be immobilized both radially and axially. Generally, a wedge is slid between the root of the blade and the bottom of the groove, with the wedge being of a size so that the root is urged against the upper flanks of the groove. The axial displacement of the blade is prevented by a bolt placed in radial grooves provided in an extension of the rim in front of the rotor disk and in a part of the blade root corresponding to said extension.

A device of this type is described in French Pat. No. 2,345,605, wherein the wedge prevents the radial movement of the bolt, with the axial movement of the wedge being prevented by a stop consisting of a lip provided in the front cowl fastened to a flange of the rotor and by a projection provided on the wedge itself. The replacement of a blade thus requires the removal of the cowl, the withdrawal of the wedge and the bolt, after which the blade may be extracted from the groove by means of axial sliding. The use of the locking device is relatively simple, but it requires at least in the downstream direction, a flange mounted on the disk to support the cowl and blade roots of a length at least equal to the axial extensions of the rim, generally called "teeth" for the housing of the bolt.

The flange and the blade roots represent a non-negligible weight, which further increases the overhang of the rotor. Furthermore, the machining of the roots adds to the costs of production.

SUMMARY OF THE INVENTION

It is the object of the invention to provide a device for the locking in place of the blades of a turbofan and to fasten the front cowl, making possible the reduction of the overhang of the intermediate compressor assembly, a reduction of the weight of the disk by the elimination among others of the front flange heretofore provided for the fastening of the cowl and also a reduction of the weight of the blades by eliminating the roots.

BRIEF DESCRIPTION OF THE DRAWINGS

The manner wherein the invention may be embodied will become apparent from the explanations and figures given hereinafter as examples.

FIG. 2 is a partial view in section taken on plane II of FIG. 1;

FIG. 3 is a cross-sectional view taken on plane III of FIG. 1; and

FIG. 4 is an exploded view of a portion of the rim and the cooperating fastening piece.

DESCRIPTION OF A PREFERRED EMBODIMENT

Figure 1:
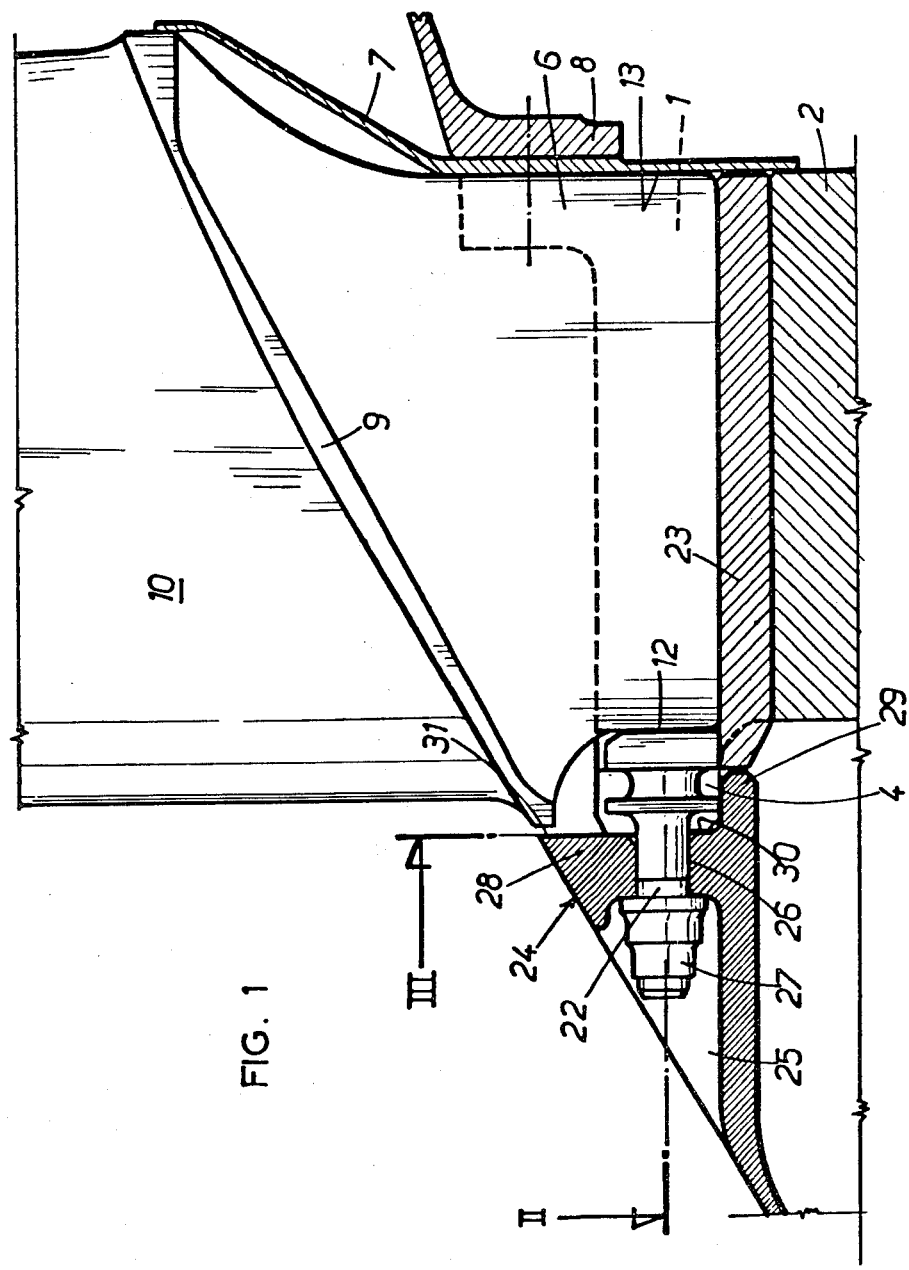
FIG. 1 is a radial section of a portion of a fan rotor with its forward cowl.

FIG. 1 is a radial sectional view of a portion of a fan rotor intended to receive a device according to the invention.

The rim 1 of the disk 2 of the fan rotor has a plurality of axial grooves 3, approximately in a dovetail configuration, such as those shown in FIG. 3.

The grooves are extended upstream by a peripheral, axial extension of the rim, thereby forming the teeth 4, the height whereof is at least equal to the height of the trapezoidal part of the dovetail. The edges of the parts of the groove formed in the extension of the rim contain, in the radial direction, two parallel and opposing slots 5, the downstream edges 14 of which (in the direction of the flow of air) are in the plane of the upstream face of the disk. The downstream face of the disk extends into the radial, peripheral collar 6, indented by the grooves 3, to which a side plate 7 and the flange 8 of the drum of the intermediate compressor are fastened by means of bolts (not shown). The side plate closes off the downstream end of the grooves 3.

The blade 10, the root 11 whereof is in the form of a dovetail corresponding to the shape of the groove in the rim, but of a lesser height, is slid axially into the groove 3. According to a characteristic of the device, the root 11 of the blade terminates in plane parallel faces 12, 13, separated by a distance equal to the thickness of the disk 2. Subsequently, radially between the teeth 4 of the groove 3, in the slots 5 provided therein, a fastening piece 15 is introduced (FIG. 4). This piece consists of a first parallelepipedic part 16 capable of engaging the radial slots 5, a second, approximately prismatic part 17, the convergent, rectangular faces 18, 19 whereof define an angle at the apex equal to the angle of the sides 20, 21 of the dovetail of the axial groove, and a third cylindrical part 22, threaded at least in part to receive the fastening means of the forward cowl. The planes of the first and second parts 16 and 17 are parallel to each other and the axis of the cylindrical part 22 is perpendicular to these planes.

When the part 16 of the fastening piece is slid radially from bottom to top (in the figure) into the slots 5, the prismatic part 17 will abut with its faces 18, 19 against the sides 20, 21 of the groove 3.

In order to maintain the piece 15 and the blade root 11 in place between the borders of the groove, the wedge 23 is introduced between the bottom of the groove and the lower part of the blade root. The length of the wedge is such that its upstream end extends sufficiently from the face of the disk to reach under the parallelepipedic part 16, thereby preventing its centripetal displacement. The centrifugal displacement of the piece is inhibited by the blocking of the prismatic part 17 against the sides of the groove.

The cowl 24 comprises an annular part 28 with a triangular cross section, as is known, wherein the counterbores 25 are provided, with the base of said counterbores having holes 26 for the passage of the cylindrical threaded part 22 of the pieces 15 and which receive fastening nuts 27 which secure the cowl in place. The annular part 28 has on its internal circumference and parallel to the axis of the cowl a ring 29, which is provided to rest against the upstream end of the wedges 23, thereby preventing their axial displacement in the forward direction, their axial displacement to the rear being blocked by the plate 7. The wall 30 of the part 28, perpendicular to the axis of the cowl, is urged against the lateral face of the teeth 4 in the rim of the disk by tightening the screws 27, while the side 31 is located in front of the upstream ends of the platforms 9 of the blades 10 to ensure aerodynamic continuity.

The device for the locking of blades according to the invention provides a reduction of the overall weight of the disk by the elimination of the downstream flange generally provided on the disk for securing the drum of the intermediate compressor. This flange is replaced by a flange 8, fastened by means of the plate 7 to the radial collar 6 of the rim of the disk.

What is claimed is:

1. In a locking device for the blades of a fan and for fastening the forward cowl of a turbojet engine, the roots of said blades being maintained in axial grooves with a dovetail configuration on the rim of a rotor disk by means of wedges placed between the blade root and the bottom of the groove, with teeth formed in the axial upstream extension of the rim comprising opposed radial slots, the improvement comprising: a fastening piece (15) consisting of three parts: a first parallelepipedic part (16) engaging the radial slots (5) of the teeth (4) of the rims, a second prismatic part (17) the convergent faces (18, 19) whereof define an angle at the apex equal to that of the sides (20, 21) of the dovetail of the axial grooves (3) extending into the teeth and against which it radially abuts, and a third cylindrical part (22) threaded at least in part to receive fastening means (27) for the forward cowl (24), the first and the second parts (16, 17) being parallel to each other and perpendicular to the axis of the third part (22).

2. A locking device according to claim 1 wherein the upstream end of the wedge (23) extends at least under the first parallelepipedic part (16) of the fastening piece.

3. A locking device according to claim 1 wherein the downstream face of the rotor disk (2) extends radially therefrom in the form of a collar (6) to which at least one side plate (7) closing off the downstream end of the grooves (3) is attached.

4. A locking device according to claim 1 wherein the forward cowl (24) has an annular part (28) of a triangular cross section and wherein a plurality of counterbores (25) is provided, with the base of said counterbores having holes (26) for the passage of the cylindrical parts (22, said part having on its inner circumference and parallel to the axis of the cowl, a cylindrical ring (29) abutting against the upstream ends of the wedges (23).

5. A locking device according to claim 1 wherein the roots of the blades have a length equal to the thickness of the rotor disk and parallel end faces (12, 13).

* * * * *

UNITED STATES PATENT AND TRADEMARK OFFICE
CERTIFICATE OF CORRECTION

PATENT NO. : 4,405,285

DATED : September 20, 1983

INVENTOR(S) : Jean M. SURDI

It is certified that error appears in the above-identified patent and that said Letters Patent is hereby corrected as shown below:

In the Title: "Turboblower" should read --Turbofan--

Signed and Sealed this

Twenty-fourth Day of January 1984

[SEAL]

Attest:

GERALD J. MOSSINGHOFF

Attesting Officer

Commissioner of Patents and Trademarks